United States Patent
Han et al.

(10) Patent No.: US 12,312,258 B1
(45) Date of Patent: May 27, 2025

(54) GRAPHENE ELECTROSTATIC FILTERING DEVICE

(71) Applicants: Hangzhou Coolkind Boat Technology Co., Ltd., Hangzhou (CN); ChinaShip Coolkind (Zhejiang) Technology Co., Ltd., Zhejiang (CN); Zhejiang Coolkind Intelligent Technology Co., Ltd., Zhejiang (CN)

(72) Inventors: Ji Han, Hangzhou (CN); Weiying Zhang, Hangzhou (CN); Ting Lin, Hangzhou (CN); Xiaodi Chang, Hangzhou (CN); Minmin Zhang, Hangzhou (CN)

(73) Assignees: HANGZHOU COOLKIND BOAT TECHNOLOGY CO., LTD., Hangzhou (CN); CHINASHIP COOLKING (ZHEJIANG) TECHNOLOGY CO., LTD., Ningbo (CN); ZHEJIANG COOLKIND INTELLIGENT TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/022,300

(22) Filed: Jan. 15, 2025

(30) Foreign Application Priority Data

Jan. 30, 2024 (CN) .......................... 202410127352.7

(51) Int. Cl.
C02F 1/46 (2023.01)
C02F 1/469 (2023.01)

(52) U.S. Cl.
CPC .............. *C02F 1/46* (2013.01); *C02F 1/4691* (2013.01); *C02F 2201/004* (2013.01); *C02F 2201/005* (2013.01); *C02F 2201/46* (2013.01)

(58) Field of Classification Search
CPC .... C02F 1/46; C02F 1/4691; C02F 2201/004; C02F 2201/005; C02F 2201/46
See application file for complete search history.

(56) References Cited

FOREIGN PATENT DOCUMENTS

| CN | 205953618 U | 2/2017 |
|---|---|---|
| CN | 209685484 U | 11/2019 |
| CN | 117404305 A | 1/2024 |

OTHER PUBLICATIONS

CNIPA, Office Action, Application No. 202410127352.7, May 10, 2024.

*Primary Examiner* — Benjamin M Kurtz
(74) *Attorney, Agent, or Firm* — WCF IP

(57) ABSTRACT

Provided is a graphene electrostatic filtering device. The device includes a filtering mechanism, and an auxiliary device is arranged on the filtering mechanism. The filtering mechanism includes a workbench, and a perforated plate. A water pump is arranged in a groove at the top of the workbench, a pressure relief valve is installed at an output end of a first water pipe, and two anode plates and two cathode plates are placed in four mounting grooves, respectively. A controller is installed at a position, adjacent to an edge, of a front surface of the workbench.

7 Claims, 10 Drawing Sheets

GRAPHENE ELECTROSTATIC FILTERING DEVICE

CROSS-REFERENCE TO RELATED APPLICATION

This patent application claims the benefit and priority of Chinese Patent Application No. 202410127352.7 filed with the China National Intellectual Property Administration on Jan. 30, 2024, the disclosure of which is incorporated by reference herein in its entirety as part of the present application.

TECHNICAL FIELD

The present disclosure relates to the field of water environment treatment, and more specifically, relates to a graphene electrostatic filtering device.

BACKGROUND

Water environment treatment refers to the process of treating and protecting the water body, aiming at improving water quality, protecting aquatic organisms, maintaining ecological balance and ensuring human health and sustainable social development.

In most existing water body treatment, filtering equipment composed of multiple layers of filter screens is generally used to achieve the treatment and improvement of water body. Although this treatment equipment can achieve the filtering treatment of the water body, the filtering speed is slow, and the filter screen is prone to blockage and microbial growth, which not only reduces the use effect of the water body filtering equipment, but also reduces the use efficiency of the water body filtering equipment.

SUMMARY

In order to overcome the defects in the prior art, some embodiments aim to provide a graphene electrostatic filtering device, which can overcome the problems that the existing water filtering equipment composed of multiple layers of filter screens is slow in filtering speed, and the filter screens are prone to blockage and microbial growth, which not only reduces the use effect of the water body filtering equipment, but also reduces the use efficiency of the water body filtering equipment.

To achieve the objective, some embodiments employ the following technical solution:

An embodiment provides a graphene electrostatic filtering device, including a filtering mechanism, and the filtering mechanism is provided with an auxiliary mechanism. The filtering mechanism comprises a workbench and a perforated plate, a water pump is installed in a groove at a top of the workbench, a rectangular groove is formed in the top of the workbench, a first water pipe is installed at an output end of the water pump, a pressure relief valve is installed at an output end of the first water pipe, and a second water pipe is installed at an output end of the pressure relief valve; a rectangular block is fixed into the rectangular groove, two mounting holes are formed in a bottom of the rectangular block, and a partition is fixed between one side of an inner wall of the rectangular groove and one side of the rectangular block; each of four mounting grooves is formed in a corresponding one of front and rear surfaces of the partition and front and rear surfaces inside the rectangular groove, and two anode plates and two cathode plates are placed in the four mounting grooves, respectively; each of the front and rear surfaces of the partition is provided with two fixing blocks, and each of the front and rear surfaces inside the rectangular groove is provided with another two fixing blocks, and two first sealing plates are mounted at a top of the rectangular block; four cylindrical holes are formed in the one side of the inner wall of the rectangular groove, and water outlets of the four cylindrical holes are fixedly sleeved with two first circular tubes and two second circular tubes, respectively; two second sealing plates movably penetrate through the top of the workbench; a first water outlet hole is formed in a position, adjacent to a top of a corresponding one of the two second sealing plates, of one side of each of the two second sealing plates, and a second water outlet hole is formed in a position, adjacent to a bottom of a corresponding one of the two second sealing plates, of one side of each of the two second sealing plates; and a controller is arranged at a position, adjacent to an edge of the workbench, of a front outer surface of the workbench.

In a preferred technical solution of the present disclosure, an output end of the second water pipe is in the rectangular groove, the perforated plate is slidingly embedded into the rectangular groove, and bottom ends of the two first sealing plates are located in the two mounting holes, respectively; and bottoms of the two first sealing plates are in contact with a bottom wall of the rectangular groove.

In a preferred technical solution of the present disclosure, a bottom of the partition and the bottom wall of the rectangular groove are fixed to each other; the two anode plates and the two cathode plates are oppositely placed in a staggered manner; eight of the fixing blocks are divided into four groups, same surfaces of two groups of the four groups of the fixing blocks are in contact with surfaces of the two anode plates, respectively; and same surfaces of an other two groups of the four groups of the fixing blocks are in contact with surfaces of the two cathode plates, respectively.

In a preferred technical solution of the present disclosure, the two first circular tubes are located at positions, adjacent to a top of the one side of the inner wall of the rectangular groove, of the one side of the inner wall of the rectangular groove, and the two second circular tubes are located at positions, adjacent to a bottom of the one side of the inner wall of the rectangular groove, of the one side of the inner wall of the rectangular groove; the four cylindrical holes are divided into two groups, each second sealing plate is located in a corresponding one group of the two groups of the cylindrical holes, and the two cathode plates, the two anode plates and the water pump are all electrically connected to the controller.

In a preferred technical solution of the present disclosure, the auxiliary mechanism comprises a dustproof shell, two electric push rods, a stabilizing seat, a buffer plate, three conductor shells, a conductor pipe, and two water outlet pipes; a dustproof cover is installed at a top of the dustproof shell, the two electric push rods are separately installed at a front surface of the workbench and a rear surface of the workbench, and outer surfaces of the two electric push rods are movably sleeved with mounting seats, respectively; and two of the mounting seats are both installed on the workbench, and the dustproof cover is movably sleeved between the outer surfaces of the two electric push rods.

In a preferred technical solution of the present disclosure, a bottom of the dustproof cover is in contact with tops of the two mounting seats, and connecting blocks are installed at bottoms of telescopic ends of the two electric push rods, and two of the connecting blocks are both located in the dustproof shell; and tops of the two connecting blocks are fixed to bottoms of the two second sealing plates, respectively, and the stabilizing seat is installed at the top of the workbench.

In a preferred technical solution of the present disclosure, the second water pipe is movably nested in the stabilizing seat, the buffer plate is movably nested in the rectangular groove, a bottom of the buffer plate is in contact with the bottom wall of the rectangular groove, a top of the buffer plate is in contact with a bottom of the perforated plate, and an output end of the second water pipe is arranged adjacent to the top of the buffer plate.

In a preferred technical solution of the present disclosure, three U-shaped frame are equidistantly distributed on a bottom of the workbench, two of the three conductor shells are fixed to the top of the workbench, and an other conductor shell of the three conductor shells is fixed to a top of the partition; the conductor pipe is fixed to a position, adjacent to a top of the workbench, of an outer surface of the workbench; a rectangular plate is fixed between insides of the two U-shaped frames; the two water outlet pipes fixedly penetrate through the bottom wall of the rectangular groove; and electric valves are installed at output ends of the two water outlet pipes, respectively, and two of the electric valves are both electrically connected to the controller.

In a preferred technical solution of the present disclosure, a tee pipe is installed between output ends of the two electric valves, a water conveying pipe is installed at a water outlet end of the tee pipe, a treatment box is placed at a top of the rectangular plate, a water inlet pipe adjacent to a top of the treatment box fixedly penetrates through one side of the treatment box, a water inlet end of the water inlet pipe is connected to a water outlet end of the water conveying pipe, a buffer shell is fixed to a position, adjacent to a top of one side of an inner wall of the treatment box, of the one side of the inner wall of the treatment box, and a water outlet end of the water inlet pipe is located in the buffer shell.

In a preferred technical solution of the present disclosure, a treatment tank is fixed into the groove at the top of the workbench, a connecting pipe is installed at an output end of the treatment tank, and an output end of the connecting pipe is connected to an input end of the water pump; a tank cover is placed at a top end of the treatment tank, an ultraviolet lamp is installed at a top of an inner wall of the tank cover, and is electrically connected to the controller; two rectangular rings are fixed into the treatment tank, and the two rectangular rings are placed in a mutually staggered manner; transparent glass is installed at a notch of the treatment tank, and a bottom of the transparent glass is in contact with tops of the two rectangular rings.

Some embodiments have the beneficial effects as follows.

According to the graphene electrostatic filtering device provided by some embodiments, the filtering speed of a water body can be improved through the graphene electrostatic filtering mechanism, and the problems of blockage of a filter screen and microbial growth can be avoided at the same time. Not only is the filtering effect of the water body filtering equipment effectively improved, but also the use efficiency of the water body filtering equipment is improved. When the water body needs to be filtered, the water body needing to be filtered is conveyed into the first water pip with the cooperation of the controller, the water pump and a conveying pipe for conveying water externally, then the water body conveyed into the first water pipe can be conveyed into the rectangular groove with the cooperation of the pressure relief valve, the first water pipe and the second water pipe, and subsequently, the anode plate and the cathode plate can be cleaned without turning off the water pump with the cooperation of the rectangular block, the mounting hole, the first sealing plate, the rectangular groove, the partition, the anode plate, the cathode plate and the controller.

Whether the filtered water is conveyed can be achieved with the cooperation of the first water outlet hole, the cylindrical hole, the second sealing plate and the first circular tube, and then through the cooperation of the second water outlet hole, the cylindrical hole, the second sealing plate and the second circular tube, a space formed by the partition, the rectangular block and the rectangular groove can be conveniently cleaned, and meanwhile, residual water in the space can be discharged.

The arrangement of the auxiliary mechanism can improve the use effect of the graphene electrostatic filtering device. When the water body entering the treatment tank needs to be disinfected, the flow velocity of the water body in the treatment tank can be reduced by the rectangular ring, and then the flowing water body can be disinfected with the cooperation of the transparent glass, the tank cover and the ultraviolet lamp. When the second sealing plate needs to be electrically controlled to move, the movement of the second sealing plate can be achieved by directly using the cooperation of the controller, the electric push rod and the connecting plate, that is, the positions of the corresponding first water outlet hole and second water outlet hole can be adjusted.

Meanwhile, with the cooperation of the dustproof shell and the dustproof cover, the dustproof protection of the bottom end of the second sealing plate and the telescopic end of the electric push rod can be achieved. Meanwhile, with the cooperation of the controller, the water outlet pipe, the electric valve, the tee pipe, the water conveying pipe, the water inlet pipe and the buffer shell, the treated water in the space formed by the partition, the rectangular block and the rectangular groove can be guided into the treatment box, that is, the anode plate and the cathode plate needing to be cleaned can be conveniently cleaned.

Figure 1:
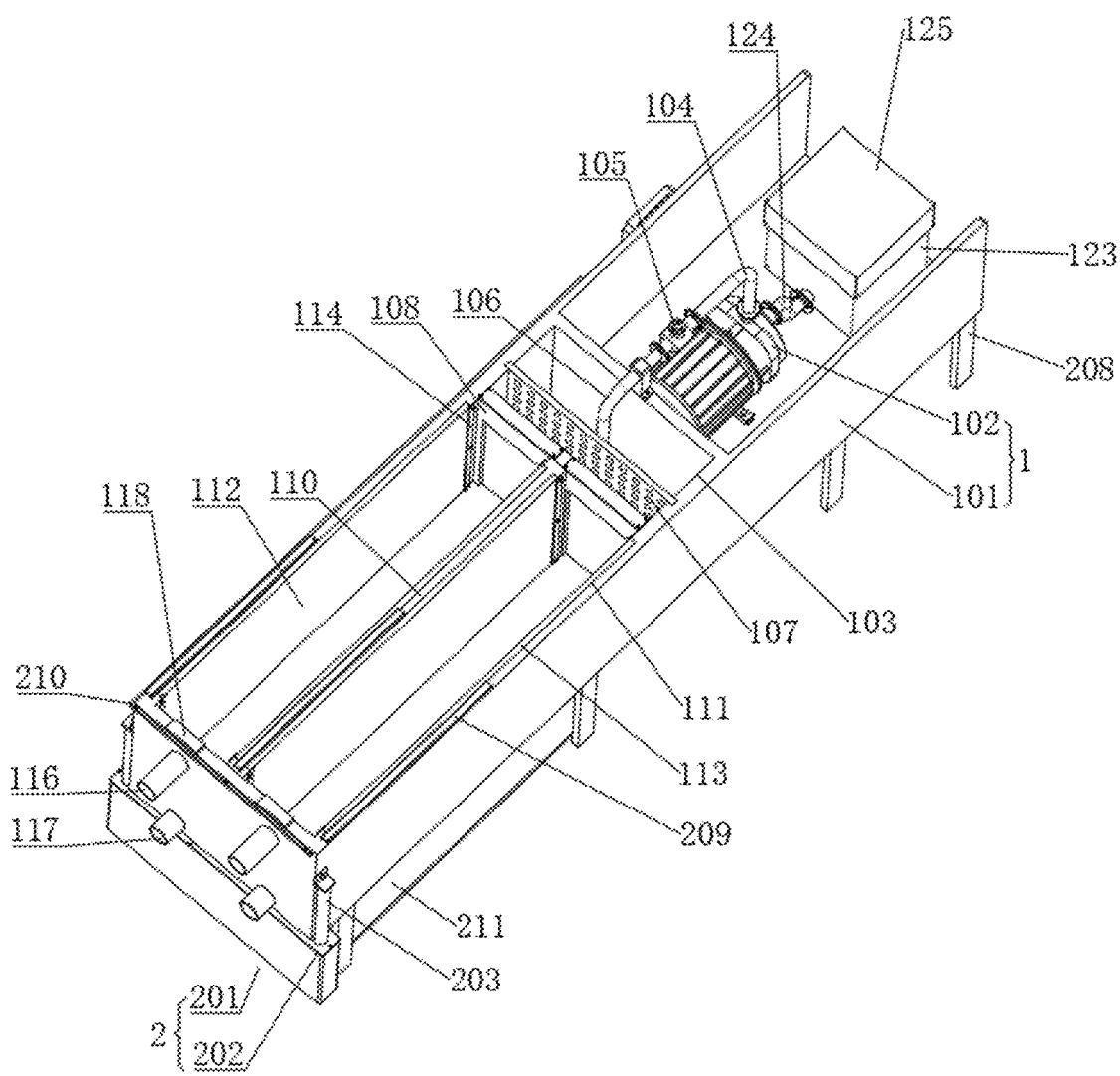
FIG. 1 is a three-dimensional diagram of a graphene electrostatic filtering device according to an embodiment of the present disclosure.

1 filtering mechanism; 101 workbench; 102 water pump; 103 rectangular groove; 104 first water pipe; 105 pressure relief valve; 106 second water pipe; 107 perforated plate; 108 rectangular block; 109 mounting hole; 110 partition; 111 mounting groove; 112 anode plate; 113 cathode plate; 114 fixing block; 115 first sealing plate; 116 first circular tube; 117 second circular tube; 118 second sealing plate; 119 first water outlet hole; 120 second water outlet hole; 121 controller; 122 cylindrical hole; 123 treatment tank; 124 connecting pipe; 125 tank cover; 126 ultraviolet lamp; 127 rectangular ring; 128 transparent glass; 2 auxiliary mechanism; 201 dustproof shell; 202 dustproof cover; 203 electric push rod; 204 mounting seat; 205 connecting block; 206 stabilizing base; 207 buffer plate; 208 U-shaped frame; 209 conductor shell; 210 conductor pipe; 211 rectangular plate; 212 water outlet pipe; 213 electric valve; 214 tee pipe; 215 water conveying pipe; 216 treatment box; 217 water inlet pipe; 218 buffer shell.

DETAILED DESCRIPTION OF THE EMBODIMENTS

The technical solution of the present disclosure is further described below with reference to the accompanying drawings and specific embodiments.

As shown in FIG. 1 to FIG. 11, a graphene electrostatic filtering device is provided in this embodiment, including a filtering mechanism 1, and an auxiliary mechanism 2 is arranged on the filtering mechanism 1.

The filtering mechanism 1 includes a workbench 101 and a perforated plate 107. A water pump 102 is installed in a groove at the top of the workbench 101, a rectangular groove 103 is formed in the top of the workbench 101, a first water pipe 104 is installed at an output end of the water pump 102, a pressure relief valve 105 is installed at an output end of the first water pipe 104, and a second water pipe 106 is installed at an output end of the pressure relief valve 105. A rectangular block 108 is fixed into the rectangular groove 103, two mounting holes 109 are formed in the bottom of the rectangular block 108, and a partition 110 is fixed between one side of an inner wall of the rectangular groove 103 and one side of the rectangular block 108. Mounting grooves 111 are formed in front and rear surfaces of the partition 110 and front and rear surfaces inside the rectangular groove 103, respectively, and two anode plates 112 and two cathode plates 113 are placed in the four mounting grooves 111, respectively. Each of the front and rear surfaces of the partition 110 is provided with two fixing blocks, and each of the front and rear surfaces inside the rectangular groove 103 is provided with another two fixing blocks, and two first sealing plates 115 are mounted at the top of the rectangular block 108. Four cylindrical holes 122 are formed in one side of the inner wall of the rectangular groove 103, and water outlets of the four cylindrical holes 122 are fixedly sleeved with two first circular tubes 116 and two second circular tubes 117, respectively. Two second sealing plates 118 movably penetrate through the top of the workbench 101. A first water outlet hole 119 is formed in a position, adjacent to the top of one side of each of the two second sealing plates 118, of one side of each of the two second sealing plates 118, and a second water outlet hole 120 is formed in a position, adjacent to the bottom of one side of each of the two second sealing plates 118, of one side of each of the two second sealing plates 118. A controller 121 is arranged adjacent to, an edge of the workbench, of a front outer surface of the workbench 101.

As shown in FIG. 1 to FIG. 4 and FIG. 8, an output end of the second water pipe 106 is in the rectangular groove 103, and the perforated plate 107 is slidingly embedded into the rectangular groove 103. Bottom ends of the two first sealing plates 115 are located in the two mounting holes 109, respectively, and bottoms of the two first sealing plates 115 are in contact with the bottom wall of the rectangular groove 103, such that whether the water emerging from a through hole of the perforated plate 107 can enter a space composed of the rectangular groove 103, the partition 110, the rectangular block 108 and the first sealing plate 115 with the cooperation of the first sealing plate 15, the mounting hole 109 and the rectangular block 108.

Figure 2:
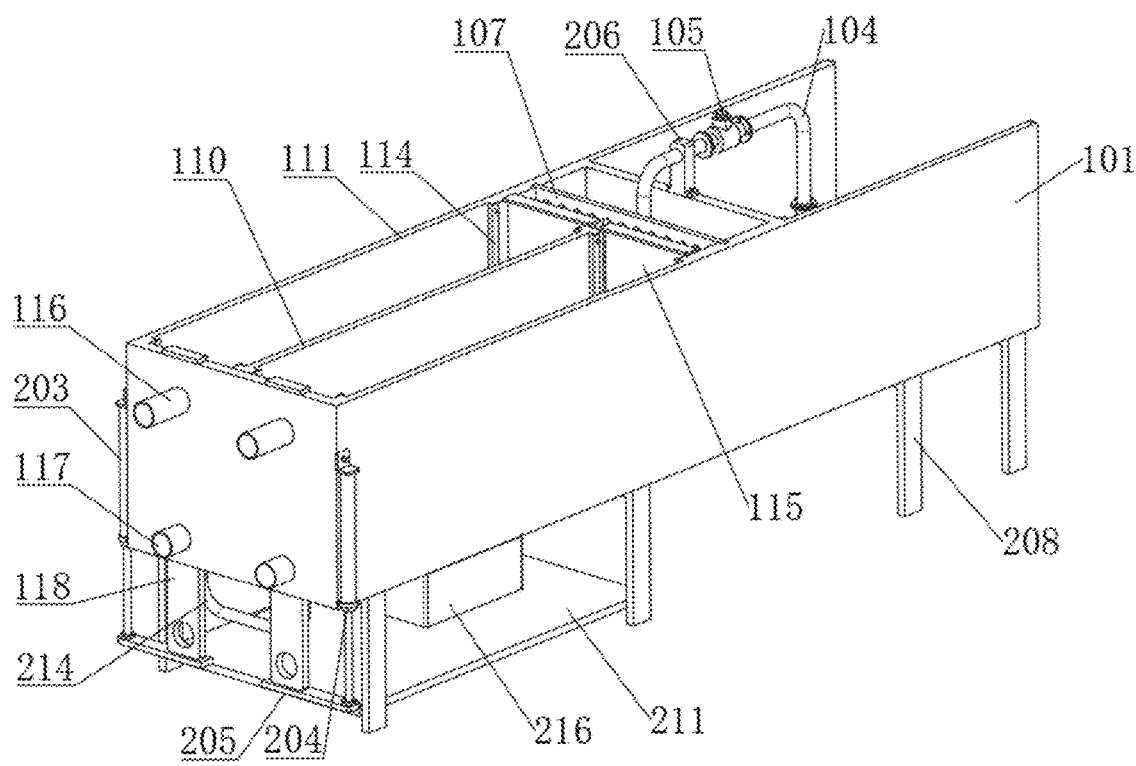
FIG. 2 is a partial three-dimensional diagram of a graphene electrostatic filtering device according to an embodiment of the present disclosure.
Figure 3:
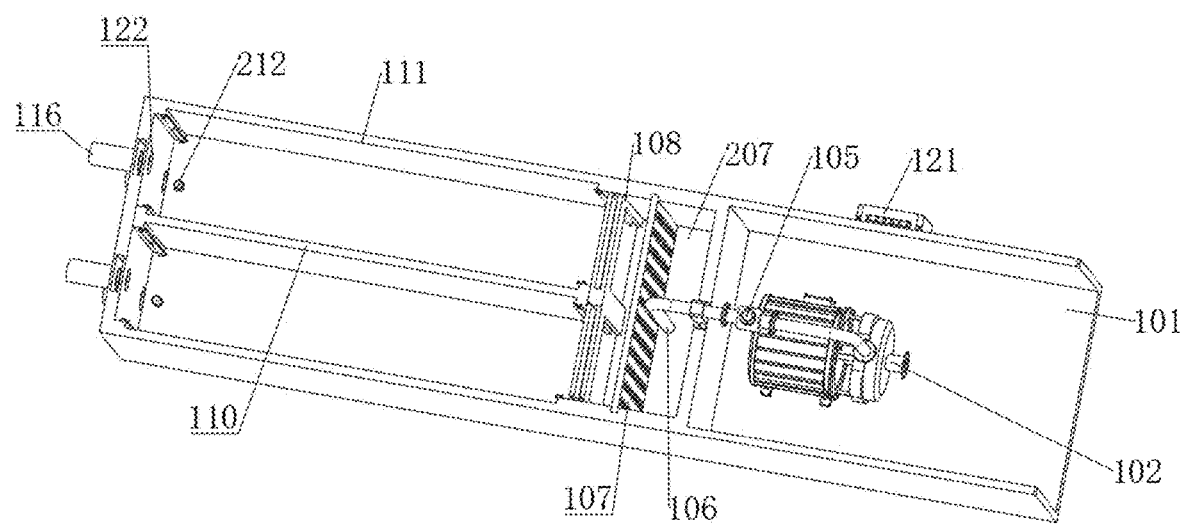
FIG. 3 is a partial three-dimensional diagram of a graphene electrostatic filtering device according to an embodiment of the present disclosure in an overhead angle.
Figure 4:
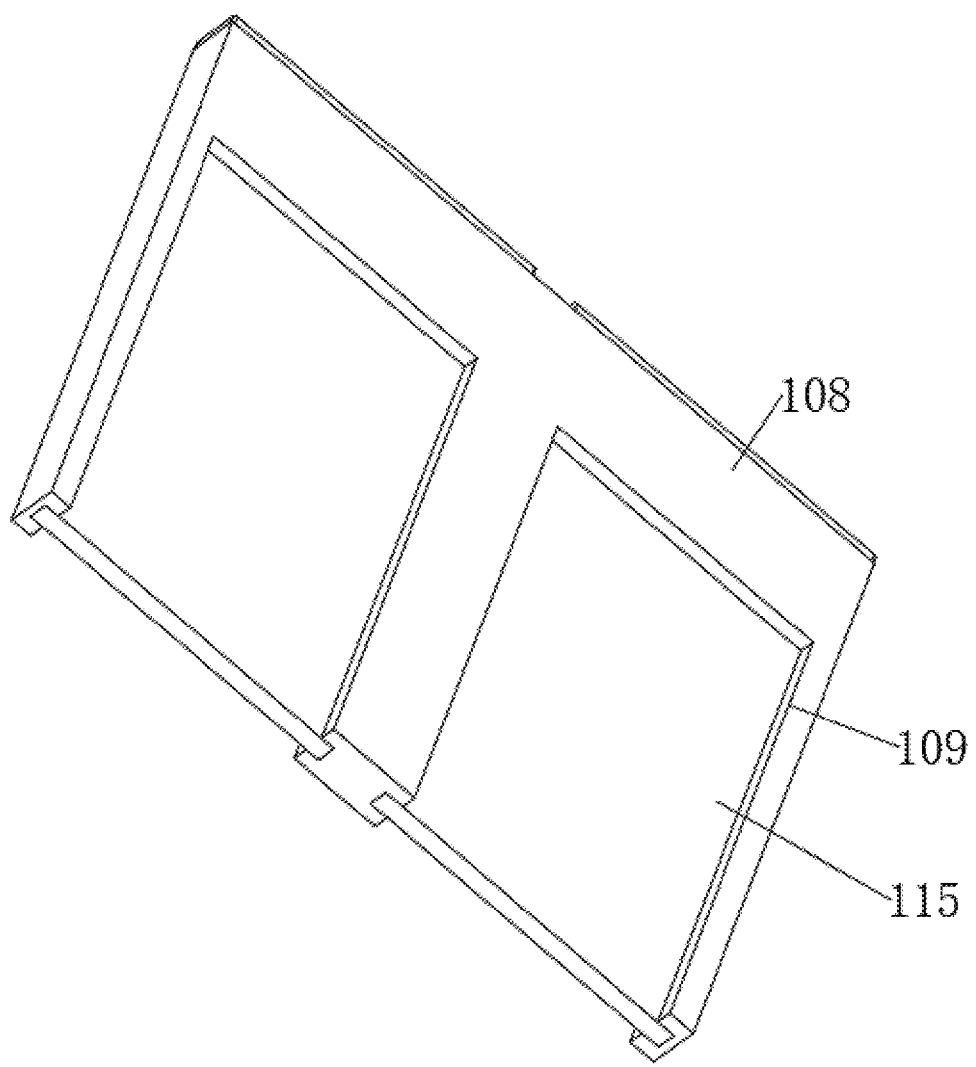
FIG. 4 is a diagram of a three-dimensional structure of a rectangular block, a mounting hole and a first sealing plate of a graphene electrostatic filtering device according to an embodiment of the present disclosure.
Figure 5:
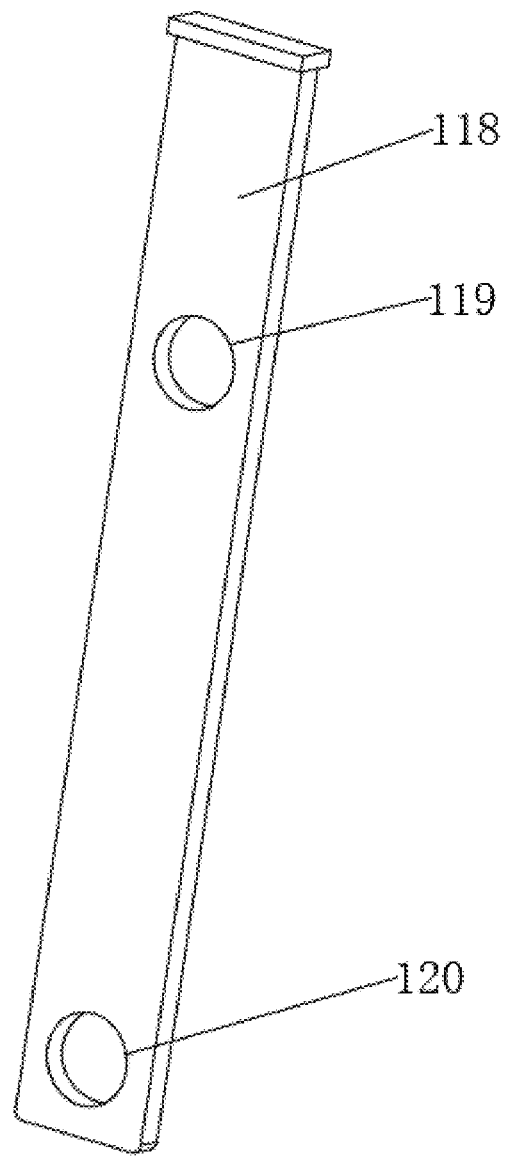
FIG. 5 is diagram of a three-dimensional structure of a second sealing late, a first water outlet hole and a second water outlet hole of a graphene electrostatic filtering device according to an embodiment of the present disclosure.
Figure 6:
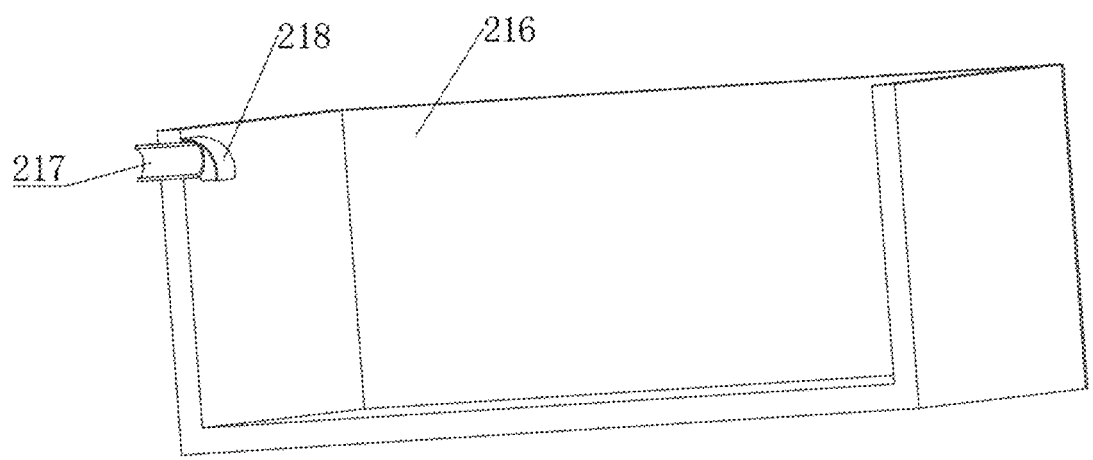
FIG. 6 is a diagram of a sectional three-dimensional structure of a treatment box, a water inlet pipe and a buffer shell of a graphene electrostatic filtering device according to an embodiment of the present disclosure.
Figure 7:
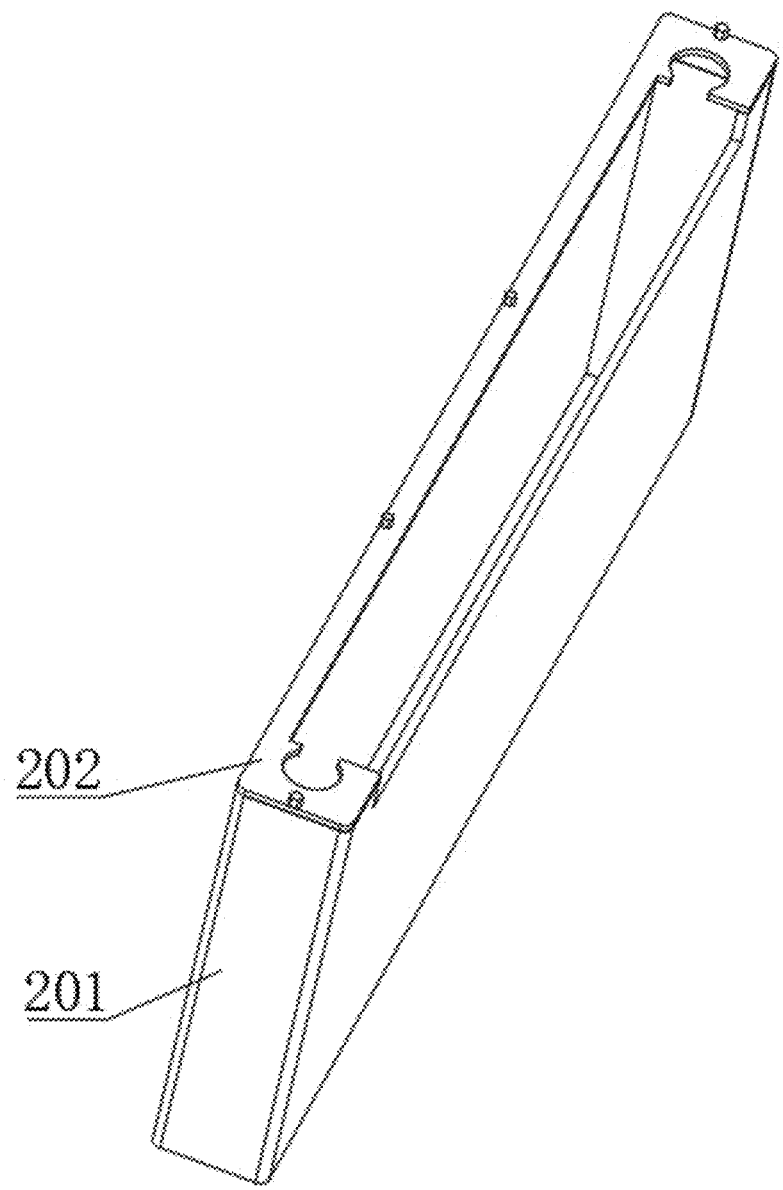
FIG. 7 is a schematic diagram of a three-dimensional structure of a dustproof cover and a dustproof shell of a graphene electrostatic filtering device according to an embodiment of the present disclosure.
Figure 8:
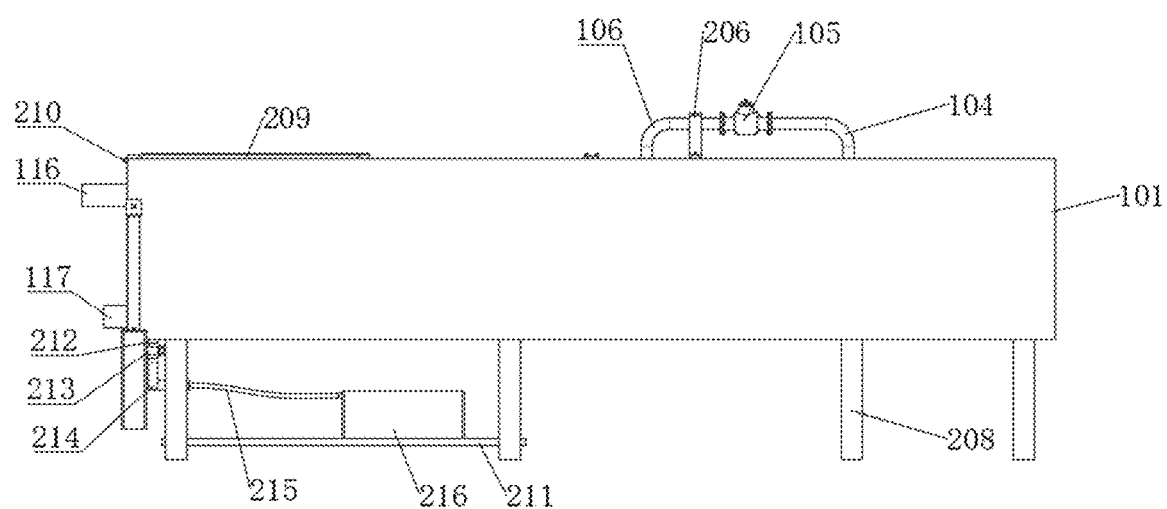
FIG. 8 is a schematic structural diagram of a graphene electrostatic filtering device according to an embodiment of the present disclosure.
Figure 9:
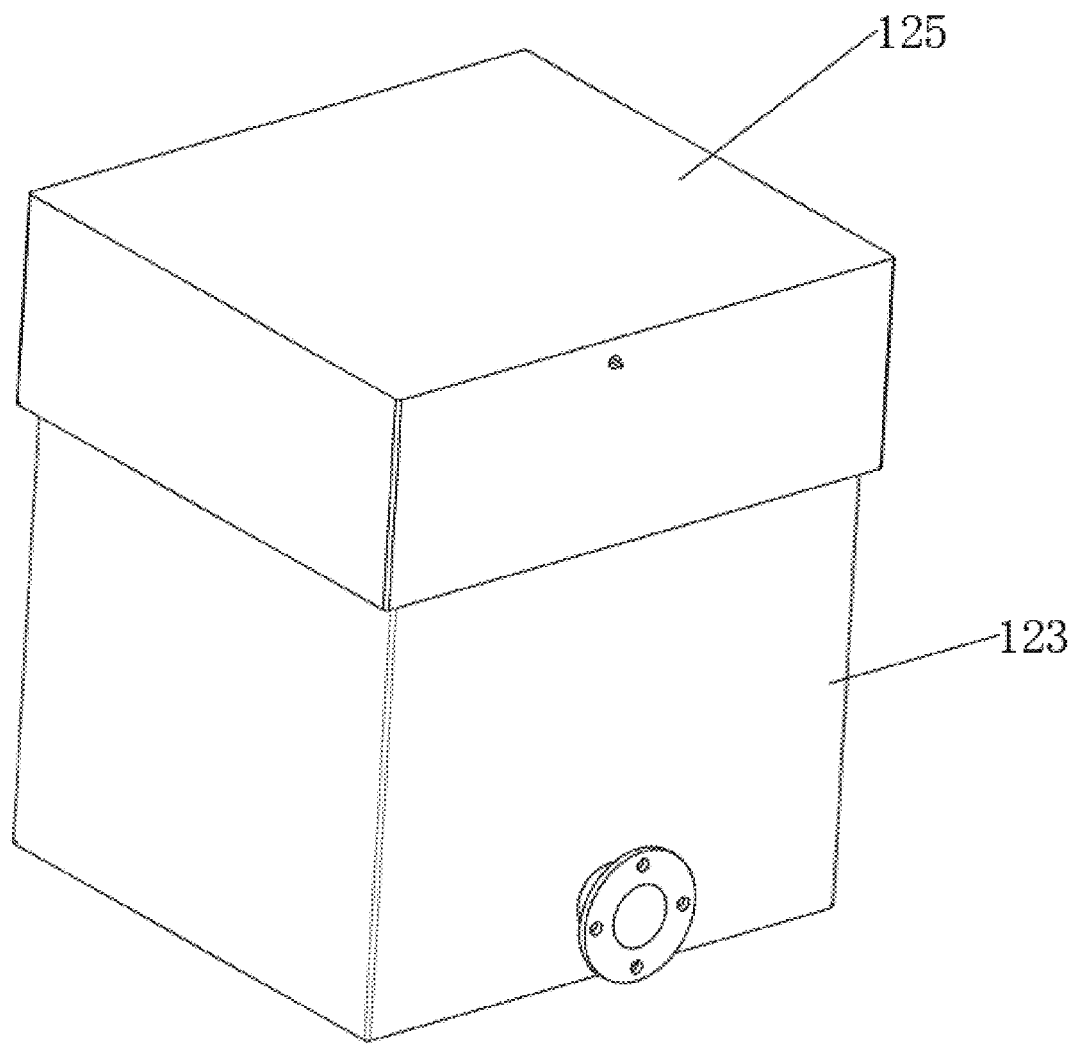
FIG. 9 is a diagram of a three-dimensional structure of a treatment tank and a tank cover of a graphene electrostatic filtering device according to an embodiment of the present disclosure.
Figure 10:
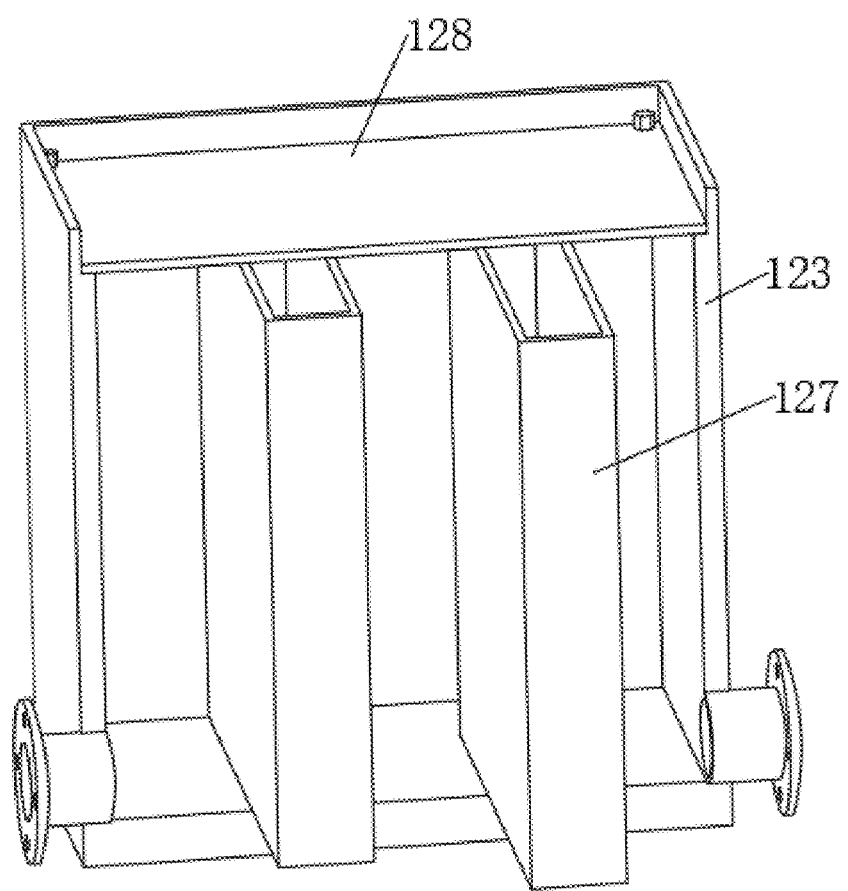
FIG. 10 is a partial sectional three-dimensional diagram of a filtering mechanism of a graphene electrostatic filtering device according to an embodiment of the present disclosure.
Figure 11:
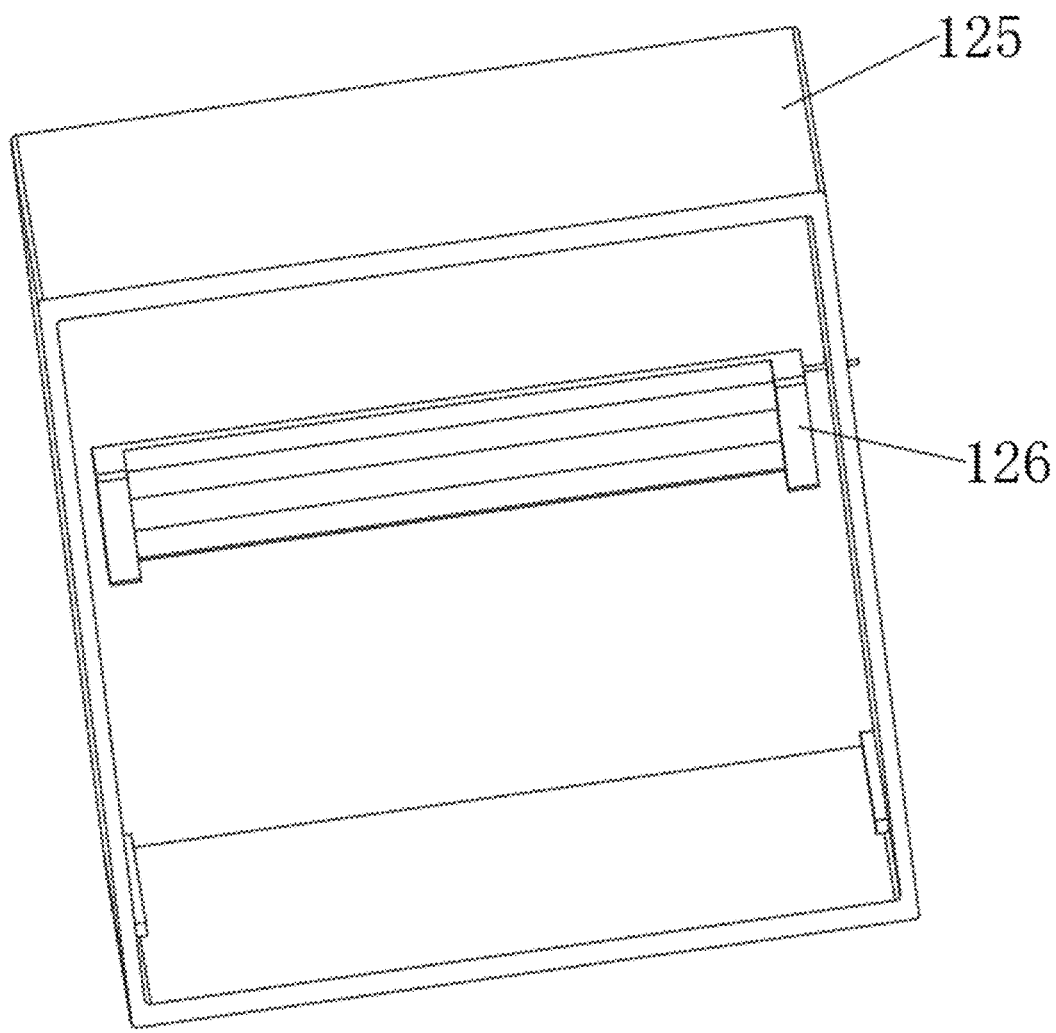
FIG. 11 is a diagram of a three-dimensional structure of a tank cover and an ultraviolet lamp of a graphene electrostatic filtering device according to an embodiment of the present disclosure.

As shown in FIG. 1 to FIG. 3, the bottom of the partition 110 is fixed to the bottom wall of the rectangular groove 103, the two anode plates 112 and the two cathode plates 113 are oppositely placed in a staggered manner. The eight fixing blocks 114 are divided into four groups. Same surfaces of two groups of the four groups of the fixing blocks 114 are in contact with surfaces of the two anode plates 112, respectively. Same surfaces of the other two groups of the four groups of the fixing blocks 114 are in contact with surfaces of the two cathode plates 113, respectively. Under the action of the fixing blocks 114, the anode plates 112 or the cathode plates 113 are fixed into the corresponding mounting grooves 111.

As shown in FIG. 1 to FIG. 3, FIG. 5 and FIG. 8, the two first circular tubes 116 are located at positions, adjacent to a top of the one side of the inner wall of the rectangular groove 103, of the one side of the inner wall of the rectangular groove 103, and the two second circular tubes 117 are located at positions, adjacent to a bottom of the one side of the inner wall of the rectangular groove 103, of the one side of the inner wall of the rectangular groove 103. The four cylindrical holes 122 are divided into two groups, each second sealing plate 118 is located in a corresponding one group of the two groups of the cylindrical holes 122, and the two cathode plates 113, the two anode plates 112 and the water pump 102 are all electrically connected to the controller 121, such that the flowing water body can be filtered with the cooperation of the controller 121, the cathode plate 113 and the anode plate 112.

As shown in FIG. 1 to FIG. 3, FIG. 7 and FIG. 8, the auxiliary mechanism 2 includes a dustproof shell 201, two electric push rods 203, a stabilizing seat 206, a buffer plate 207, three conductor shells 209, a conductor pipe 210, and two water outlet pipes 212. A dustproof cover 202 is installed at the top of the dustproof shell 201, the two electric push rods 203 are installed separately at the front surface of the workbench 101 and a rear surface of the workbench 101, and outer surfaces of the two electric push rods 203 are movably sleeved with mounting seats 204, respectively. The two mounting seats 204 are both installed on the workbench 101, and the dustproof cover 202 is movably sleeved between the outer surfaces of the two electric push rods 203, such that the dustproof protection of the bottom end of the second sealing plate 118 and the telescopic end of the electric push rod 203 can be achieved with the cooperation of the dustproof cover 202 and the dustproof shell 201.

As shown in FIG. 1 to FIG. 3, FIG. 5, FIG. 7 and FIG. 8, the bottom of the dustproof cover 202 is in contact with the tops of the two mounting seats 204, connecting blocks 205 are installed at the bottoms of telescopic ends of the two electric push rods 203, and the two connecting blocks 205 are both located in the dustproof shell 201. The tops of the two connecting blocks 205 are fixed to the bottoms of the two second sealing plates 118, respectively, and the stabilizing seat 206 is installed at the top of the workbench 101, such that the stability of the second water pipe 106 during operation can be improved under the action of the stabilizing base 206.

As shown in FIG. 1 to FIG. 3 and FIG. 8, the second water pipe 106 is movably nested in the stabilizing seat 206, the buffer plate 207 is movably nested in the rectangular groove 103, the bottom of the buffer plate 207 is in contact with the bottom wall of the rectangular groove 103, the top of the buffer plate 207 is in contact with the bottom of the perforated plate 107, and an output end of the second water pipe 106 is arranged adjacent to the top of the buffer plate 207, such that an impact force of the water conveyed into the rectangular groove 103 by the second water pipe 106 can be conveniently reduced under the action of the buffer plate 207.

As shown in FIG. 1 to FIG. 3 and FIG. 8, three U-shaped frames 208 are equidistantly distributed on the bottom of the workbench 101, two of the conductor shells 209 are fixed to the top of the workbench 101, and the other conductor shell 209 is fixed to the top of the partition 110. The conductor pipe 210 is fixed to a position, adjacent to the top of the workbench 101, of an outer surface of the workbench 101. A rectangular plate 211 is fixed between the insides of the two U-shaped frames 208. The two water outlet pipes 212 fixedly penetrate through the bottom wall of the rectangular groove 103. Electric valves 213 are installed at output ends of the two water outlet pipes 212, respectively, and the two electric valves 213 are both electrically connected to the controller 121, such that whether the water conveyed from the water outlet pipe 212 can be conveyed into the tee pipe 214 can be controlled with the cooperation of the controller 121 and the electric valve 213.

As shown in FIG. 1 to FIG. 3, FIG. 6 and FIG. 8, a tee pipe 214 is installed between output ends of the two electric valves 213, and a water conveying pipe 215 is installed at a water outlet end of the tee pipe 214, such that the treated water conveyed from the tee pipe 214 can be conveyed into the treatment box 216 with the cooperation of the water conveying pipe 215 and the water inlet pipe 217. The treatment box 216 is placed at the top of the rectangular plate 211, a water inlet pipe 217 adjacent to a top of the treatment box fixedly penetrates through one side of the treatment box 216, a water inlet end of the water inlet pipe 217 is connected to a water outlet end of the water conveying pipe 215, a buffer shell 218 is fixed to a position, adjacent to the top of one side of an inner wall of the treatment box, of the one side of the inner wall of the treatment box 216, and a water outlet end of the water inlet pipe 217 is located in the buffer shell 218, such that the impact force of the water discharged from the water inlet pipe 217 on the inner wall of the treatment box 216 can be reduced under the action of the buffer shell 218.

As shown in FIG. 1 to FIG. 3 and FIG. 8 to FIG. 11, a treatment tank 123 is fixed into the groove at the top of the workbench 101, a connecting pipe 124 is installed at an output end of the treatment tank 123, and an output end of the connecting pipe 124 is connected to an input end of the water pump 102. A tank cover 125 is placed at a top end of the treatment tank 123, an ultraviolet lamp 126 is installed at the top of an inner wall of the tank cover 125, and is electrically connected to the controller 121. Two rectangular rings 127 are fixed into the treatment tank 123, and the two rectangular rings 127 are placed in a mutually staggered manner. Transparent glass 128 is installed at a notch of the treatment tank 123, and the bottom of the transparent glass 128 is in contact with the tops of the two rectangular rings 127, such that the flow velocity of the water when passing through the treatment tank 123 can be reduced under the action of the rectangular ring 127.

The whole mechanism can achieve the effect as follows: when the water needs to be treated, the controller 121 is connected to an external power supply, then the use program of the controller 121 is set, an input end of the treatment tank 123 is connected to an output end of a conveying pipe for externally conveying water, and then the pressure relief valve 105 is manually adjusted. When everything is ready, the controller 121 is directly used to start the water pump 102, the ultraviolet lamp 126, one of the anode plates 112 (graphene), and one of the cathode plates 113 (carbon fiber). At this time, the started water pump 102 will directly make an input end of the treatment box 123 have suction under the cooperation of a connection relationship of components of the filtering mechanism 1, the input end of the treatment box 123 with the suction will directly convey the water body output from the conveying pipe for externally conveying water to the inside of the treatment box 123, and then the speed of the water body entering the treatment tank 123 will be reduced with the cooperation of the two rectangular rings 127. Meanwhile, the started ultraviolet lamp 126 can directly disinfect the water body passing through the inside of the treatment tank 123 under the cooperation of the tank cover 125, the transparent glass 128 and the two rectangular rings 127, the disinfected water body will be directly output from an output end of the treatment tank 123 to enter the connecting pipe 124, and then enter the water pump 102. When the disinfected water body enters the water pump 102, the water body conveyed into the first water pipe 104 will be directly conveyed into the pressure relief valve 105. Afterwards, with the cooperation of the stabilizing seat 206, the water body is directly and stably conveyed into the second water pipe 106, and then conveyed into the rectangular groove 103. When the water is conveyed into the rectangular groove 103, the impact force caused by the water body entering the rectangular groove 103 can be directly buffered with the cooperation of the buffer plate 207 and the perforated plate, and then the water body after the impact force is reduced moves to a direction of the rectangular block 108. Then, the corresponding first sealing plate 115 is pulled out from the inside of the corresponding mounting hole 109. When the first sealing plate 115 is removed from the inside of the corresponding mounting hole 109, the water flowing to the rectangular block 108 directly passes through the inside of the mounting hole 109 at which the first sealing plate 115 is taken out, and then enters a space (a space where one of the cathode plates 113 and one of the anode plates 112 are located) formed by the partition 110, the rectangular block 108 and the rectangular groove 103. When the water body reaches the inside of the space, positive and negative charges are respectively applied by the started cathode plate 113 and anode plate 112 to form an electrostatic field. When the pollutants in the water body are charged with the positive and negative charges, the positively charged pollutants will be attracted to and attached to the cathode plate 113, and the negatively charged pollutants will be attracted to and attached to the anode plate 112. When the water body reaches the inlets of the corresponding group of cylindrical holes 122, the pollutants in the water body can be completely treated. When a depth of the water in the space reaches an inlet of an upper cylindrical hole 122 of the corresponding group of cylindrical holes 122, the controller 121 is directly used to start the corresponding electric push rod 203, at this time, the started electric push rod 203 will directly drive the connecting block 205 connected thereto to move upward. Meanwhile, the moving connecting block 205 will drive the second sealing plate 118 connected thereto to move upwards. When the first water outlet hole 119 on the second sealing plate 118 communicates with the upper cylindrical hole 122 of the corresponding group of cylindrical holes 122, the controller 121 is directly used to pause the electric push rod 203. In this case, the filtered water in this space can directly pass through the inside of the space formed by the upper cylindrical hole 122 and the first water outlet hole 119, and then enter the corresponding upper first circular tube 116 to be conveyed away. When the anode plate 112 and the cathode plate 113 in the space need to be treated, the first sealing plate 115 which is taken out before is directly installed to an original position, and then the corresponding second water outlet hole 120 is moved to communicate with the upper cylindrical hole 122 of the corresponding group of cylindrical holes 122 with the cooperation of the controller 121, the corresponding electric push rod 203 and the connecting block 205. Afterwards, the water body remaining in the space is discharged with the cooperation of the cylindrical hole 122 and the second water outlet hole 120, such that the inside of the space can be conveniently cleaned later. Subsequently, the other first sealing plate 115 is taken out from the inside of the corresponding mounting hole 109, one cathode plate 113 and one anode plate 112 which are started before are turned off, and then the other anode plate 112 and the other cathode plate 113 are started. In a case of not turning off the water pump 102, the operation of treating the water body before can be repeated to continuously filter the water body, that is, the use efficiency of the filtering device is improved. When the anode plate 112 and the cathode plate 113 attached with the pollutants need to be treated, the corresponding fixing blocks 114 are removed, and then the anode plate 112 and the cathode plate 113 which need to be treated are removed from the insides of the corresponding mounting grooves 111 and then placed in the treatment box 216. When the cathode plate 113 and the anode plate 112 placed in the treatment box 216 need to be cleaned, the controller 121 is directly used to open the electric valve 213 corresponding to the space for filtering the water body. When the electric valve 213 is opened, the treated water in the space for filtering the water body can directly enter from an inlet of the corresponding water outlet pipe 212, is conveyed into the tee pipe 214 after passing through the inside of the opened electric valve 213, and is then conveyed into the water conveying pipe 215 and subsequently conveyed into the water inlet pipe 217. After that, the water can be directly conveyed into the treatment box 216 with the cooperation of the buffer shell 218. When the treatment box 216 is injected with a proper amount of water, the controller 121 is directly used to close the electric valve 213, and at this time, a brush is used to gently wipe and clean the surfaces of the anode plate 112 and the cathode plate 113, and the anode plate 112 and the cathode plate 113 are cleaned.

Each of the two rectangular rings 127 and the transparent glass 128 is a transparent object made of a quartz material.

The water pump 102, the pressure relief valve 105, the anode plate 112, the cathode plate 113, the controller 121 (PLC (programmable logic controller)), the electric push rod 203, the ultraviolet lamp 126 and the electric valve 213 are in the prior art, and thus will not be explained more here.

Other technologies in this embodiment are in the prior art.

The present disclosure has been described by preferred embodiments, and those skilled in the art should understand that various changes and equivalent replacements can be made to these features and embodiments without departing from the spirit and scope of the present disclosure. The present disclosure is not limited by the specific embodiments disclosed here, and other embodiments that fall within the claims of the present disclosure are within the scope of protection of the present disclosure.

What is claimed is:

1. A graphene electrostatic filtering device, comprising a filtering mechanism (1), wherein the filtering mechanism (1) is provided with an auxiliary mechanism (2);

the filtering mechanism (1) comprises a workbench (101) and a perforated plate (107), a water pump (102) is installed in a groove at a top of the workbench (101), a rectangular groove (103) is formed in the top of the workbench (101), a first water pipe (104) is installed at an output end of the water pump (102), a pressure relief valve (105) is installed at an output end of the first water pipe (104), and a second water pipe (106) is installed at an output end of the pressure relief valve (105); a rectangular block (108) is fixed into the rectangular groove (103), two mounting holes (109) are formed in a bottom of the rectangular block (108), and a partition (110) is fixed between one side of an inner wall of the rectangular groove (103) and one side of the rectangular block (108); each of four mounting grooves (111) is formed in a corresponding one of front and rear surfaces of the partition (110) and front and rear surfaces inside the rectangular groove (103), and two anode plates (112) and two cathode plates (113) are placed in the four mounting grooves (111), respectively; each of the front and rear surfaces of the partition (110) is provided with two fixing blocks, and each of the front and rear surfaces inside the rectangular groove (103) is provided with another two fixing blocks, and two first sealing plates (115) are mounted at a top of the rectangular block (108); four cylindrical holes (122) are formed in the one side of the inner wall of the rectangular groove (103), and water outlets of the four cylindrical holes (122) are fixedly sleeved with two first circular tubes (116) and two second circular tubes (117), respectively; two second sealing plates (118) movably penetrate through the top of the workbench (101); a first water outlet hole (119) is formed in a position, adjacent to a top of a corresponding one of the two second sealing plates, of one side of each of the two second sealing plates (118), and a second water outlet hole (120) is formed in a position, adjacent to a bottom of a corresponding one of the two second sealing plates, of one side of each of the two second sealing plates (118); and a controller (121) is arranged at a position, adjacent to an edge of the workbench (101), of a front outer surface of the workbench (101);

an output end of the second water pipe (106) is in the rectangular groove (103), the perforated plate (107) is slidingly embedded into the rectangular groove (103), and bottom ends of the two first sealing plates (115) are located in the two mounting holes (109), respectively; and bottoms of the two first sealing plates (115) are in contact with a bottom wall of the rectangular groove (103);

a bottom of the partition (110) and the bottom wall of the rectangular groove (103) are fixed to each other; the two anode plates (112) and the two cathode plates (113) are oppositely placed in a staggered manner; eight of the fixing blocks (114) are divided into four groups, same surfaces of two groups of the four groups of the fixing blocks (114) are in contact with surfaces of the two anode plates (112), respectively; and same surfaces of an other two groups of the four groups of the fixing blocks (114) are in contact with surfaces of the two cathode plates (113), respectively;

the two first circular tubes (116) are located at positions, adjacent to a top of the one side of the inner wall of the rectangular groove (103), of the one side of the inner wall of the rectangular groove (103), and the two second circular tubes (117) are located at positions, adjacent to a bottom of the one side of the inner wall of the rectangular groove (103), of the one side of the inner wall of the rectangular groove (103); the four cylindrical holes (122) are divided into two groups, each second sealing plate (118) is located in a corresponding one group of the two groups of the cylindrical holes (122), and the two cathode plates (113), the two anode plates (112) and the water pump (102) are all electrically connected to the controller (121).

2. The graphene electrostatic filtering device according to claim 1, wherein the auxiliary mechanism (2) comprises a dustproof shell (201), two electric push rods (203), a stabilizing seat (206), a buffer plate (207), three conductor shells (209), a conductor pipe (210), and two water outlet pipes (212); a dustproof cover (202) is installed at a top of the dustproof shell (201), the two electric push rods (203) are separately installed at a front surface of the workbench (101) and a rear surface of the workbench (101), and outer surfaces of the two electric push rods (203) are movably sleeved with mounting seats (204), respectively; and two of the mounting seats (204) are both installed on the workbench (101), and the dustproof cover (202) is movably sleeved between the outer surfaces of the two electric push rods (203).

3. The graphene electrostatic filtering device according to claim 2, wherein a bottom of the dustproof cover (202) is in contact with tops of the two mounting seats (204), and connecting blocks (205) are installed at bottoms of telescopic ends of the two electric push rods (203), and two of the connecting blocks (205) are both located in the dustproof shell (201); and tops of the two connecting blocks (205) are fixed to bottoms of the two second sealing plates (118), respectively, and the stabilizing seat (206) is installed at the top of the workbench (101).

4. The graphene electrostatic filtering device according to claim 3, wherein the second water pipe (106) is movably nested in the stabilizing seat (206), the buffer plate (207) is movably nested in the rectangular groove (103), a bottom of the buffer plate (207) is in contact with the bottom wall of the rectangular groove (103), a top of the buffer plate (207) is in contact with a bottom of the perforated plate (107), and an output end of the second water pipe (106) is arranged adjacent to the top of the buffer plate (207).

5. The graphene electrostatic filtering device according to claim 2, wherein three U-shaped frame (208) are equidistantly distributed on a bottom of the workbench (101), two of the three conductor shells (209) are fixed to the top of the workbench (101), and an other conductor shell (209) of the three conductor shells (209) is fixed to a top of the partition (110); the conductor pipe (210) is fixed to a position, adjacent to a top of the workbench (101), of an outer surface of the workbench (101); a rectangular plate (211) is fixed between insides of the two U-shaped frames (208); the two water outlet pipes (212) fixedly penetrate through the bottom wall of the rectangular groove (103); and electric valves (213) are installed at output ends of the two water outlet pipes (212), respectively, and two of the electric valves (213) are both electrically connected to the controller (121).

6. The graphene electrostatic filtering device according to claim 5, wherein a tee pipe (214) is installed between output ends of the two electric valves (213), a water conveying pipe (215) is installed at a water outlet end of the tee pipe (214), a treatment box (216) is placed at a top of the rectangular plate (211), a water inlet pipe (217) adjacent to a top of the treatment box (216) fixedly penetrates through one side of the treatment box (216), a water inlet end of the water inlet pipe (217) is connected to a water outlet end of the water conveying pipe (215), a buffer shell (218) is fixed to a position, adjacent to a top of one side of an inner wall of the treatment box (216), of the one side of the inner wall of the treatment box (216), and a water outlet end of the water inlet pipe (217) is located in the buffer shell (218).

7. The graphene electrostatic filtering device according to claim 1, wherein a treatment tank (123) is fixed into the groove at the top of the workbench (101), a connecting pipe (124) is installed at an output end of the treatment tank (123), and an output end of the connecting pipe (124) is connected to an input end of the water pump (102); a tank cover (125) is placed at a top end of the treatment tank (123), an ultraviolet lamp (126) is installed at a top of an inner wall of the tank cover (125), and is electrically connected to the controller (121); two rectangular rings (127) are fixed into the treatment tank (123), and the two rectangular rings (127) are placed in a mutually staggered manner; transparent glass (128) is installed at a notch of the treatment tank (123), and a bottom of the transparent glass (128) is in contact with tops of the two rectangular rings (127).

* * * * *